United States Patent
Paullus

(10) Patent No.: US 11,188,755 B2
(45) Date of Patent: Nov. 30, 2021

(54) AUGMENTED REALITY SYSTEMS AND METHODS INCORPORATING WEARABLE PIN BADGES

(71) Applicant: Caleb John Paullus, London (GB)

(72) Inventor: Caleb John Paullus, London (GB)

(73) Assignee: Pinfinity, LLC, Glendale, CA (US)

( * ) Notice: Subject to any disclaimer, the term of this patent is extended or adjusted under 35 U.S.C. 154(b) by 0 days.

(21) Appl. No.: 16/915,917

(22) Filed: Jun. 29, 2020

(65) Prior Publication Data

US 2021/0133449 A1 May 6, 2021

Related U.S. Application Data

(60) Provisional application No. 62/929,214, filed on Nov. 1, 2019.

(51) Int. Cl.
*G06K 9/00* (2006.01)
*G06T 15/10* (2011.01)
*G06T 7/73* (2017.01)
*G06T 19/00* (2011.01)

(52) U.S. Cl.
CPC ............ *G06K 9/00671* (2013.01); *G06T 7/73* (2017.01); *G06T 15/10* (2013.01); *G06T 19/006* (2013.01); *G06K 2209/25* (2013.01); *G06T 2215/16* (2013.01)

(58) Field of Classification Search
None
See application file for complete search history.

(56) References Cited

U.S. PATENT DOCUMENTS

| | | | |
|---|---|---|---|
| 10,026,228 B2 | 7/2018 | Yuen et al. | |
| 2014/0188669 A1 | 7/2014 | Freeman et al. | |
| 2014/0378023 A1 | 12/2014 | Muthyala et al. | |
| 2015/0206349 A1 | 7/2015 | Rosenthal et al. | |
| 2018/0276473 A1* | 9/2018 | Kim | G06F 16/434 |
| 2018/0373949 A1* | 12/2018 | Deng | G06K 9/325 |
| 2019/0318186 A1* | 10/2019 | Sergott | G06K 9/00456 |
| 2020/0175609 A1* | 6/2020 | Zolotow | G06Q 50/01 |
| 2020/0184223 A1* | 6/2020 | Rad | G06F 1/1686 |
| 2020/0226407 A1* | 7/2020 | Kendrick | G06N 20/10 |
| 2021/0065453 A1* | 3/2021 | Sergott | H04W 4/025 |

OTHER PUBLICATIONS

Xie, Lei, et al. "Tell me what I see: Recognize RFID tagged objects in augmented reality systems." Proceedings of the 2016 ACM International Joint Conference on Pervasive and Ubiquitous Computing. 2016. (Year: 2016).*

* cited by examiner

*Primary Examiner* — Ryan M Gray
(74) *Attorney, Agent, or Firm* — Lynch LLP

(57) ABSTRACT

Systems and methods disclosed in this application are directed to augmented reality for used with pin badges. Pin badges can be worn, held, or set within view of an AR device having a camera. The AR device sends images or video from its camera to a platform server that determines whether a pin badge exists in view of the camera. If a pin badge exists, it is identified and augmented reality imagery related to the pin badge is transmitted back to the AR device so that the AR device can incorporate that augmented reality imagery into a video stream from its camera as shown on its display.

20 Claims, 7 Drawing Sheets

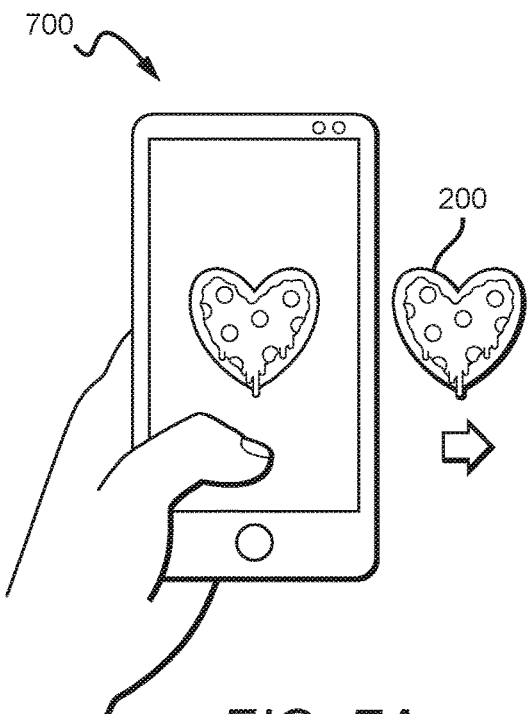
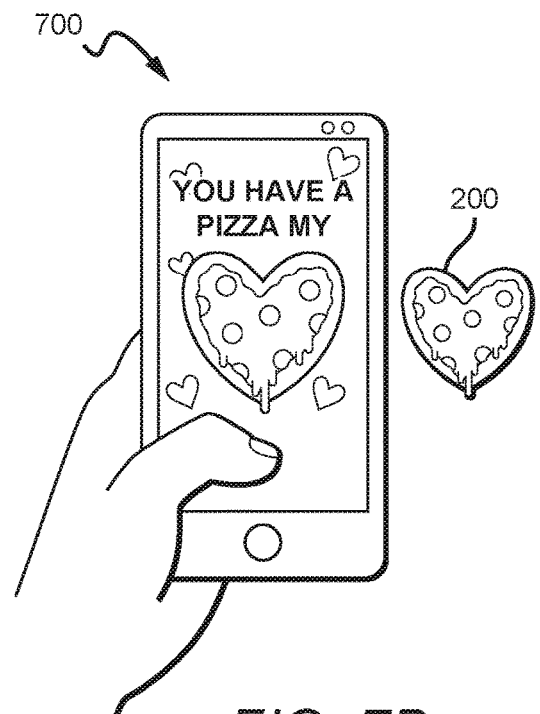
FIG. 7A
FIG. 7B
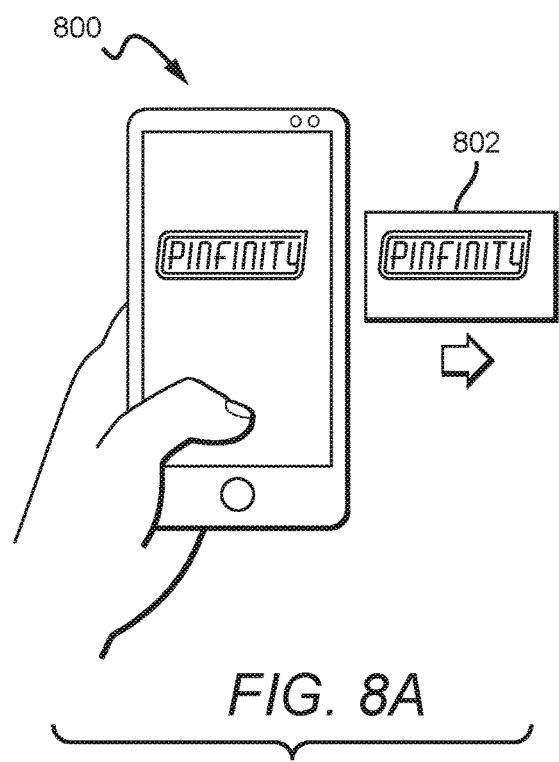
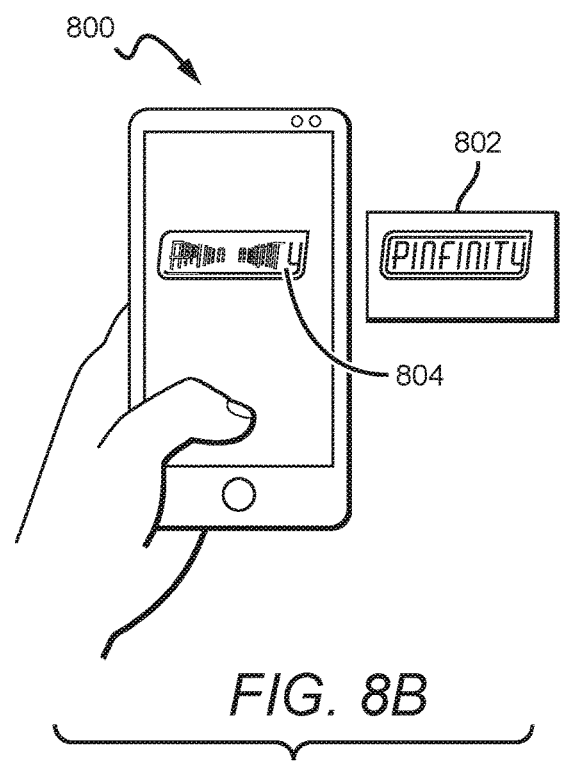
FIG. 8A
FIG. 8B

AUGMENTED REALITY SYSTEMS AND METHODS INCORPORATING WEARABLE PIN BADGES

This application claims priority to U.S. Provisional Patent Application No. 62/929,214, filed Nov. 1, 2019. All extrinsic materials identified in this application are incorporated by reference in their entirety.

FIELD OF THE INVENTION

The field of the invention is augmented reality.

BACKGROUND

The background description includes information that may be useful in understanding the present invention. It is not an admission that any of the information provided in this application is prior art or relevant to the presently claimed invention, or that any publication specifically or implicitly referenced is prior art.

Augmented reality is a technology that superimposes a computer-generated image on a user's view of the real world, thus providing a composite view. As access to cameras, handheld devices, processing power, as well as availability of high quality, inexpensive sensors improves, so to do opportunities to create augmented reality systems that are accessible to anyone with a smart phone (or any other device having a camera).

Many efforts have been made to incorporate augmented reality into a variety of different activities. For example, U.S. Patent Application Publication No. 2014/0378023 (owned by Lego) is directed to an augmented reality system that uses a video camera to identify markers on, e.g., Lego bricks in its field of view and to then incorporate, e.g., an animation in that location. The patent application gives an example whereby a Lego figure is identified by a camera by looking for, among other things, an AR marker, and then that figure is shown animated. In another example, the application describes placing bricks with icons printed on a face that a camera can identify and use to incorporate visual effects into the live image shown on a display screen. But this application fails to consider how augmented reality imagery can be implemented in the context of wearable items.

In another example, U.S. Pat. No. 10,026,228 is directed to an augmented reality system that facilitates scene modification. This patent describes, for example, placing a marker in a scene so that an augmented reality system can depict the area where the marker is placed as having a higher elevation than it has. Methods described in the '228 Patent are directed to scene modification using markers for location instead of modifying how a marker appears in a scene.

U.S. Patent Application No. 2014/0188669 teaches an augmented reality system that helps people virtually try on clothes. This application fails to consider the use of any in-scene markers, instead relying on, e.g., visual cues such as facial recognition that it uses to render additional imagery into a scene. This system fails to consider using wearable pin badges to anchor newly introduced visuals in a scene U.S. Patent Application No. 2015/0206349 is directed to an augmented reality system intended to facilitate introduction of advertisements into scenes. In one example, the '349 Application describes people wearing t-shirts that can act as wearable billboards that the augmented reality system can use to place ads on.

None of these applications consider augmented reality systems or methods directed to using wearable pin badges to anchor augmented reality imagery, nor do they consider different ways augmented reality imagery can be based on those wearable pin badges.

These and all other extrinsic materials discussed in this application are incorporated by reference in their entirety. Where a definition or use of a term in an incorporated reference is inconsistent or contrary to the definition of that term provided in this application, the definition of that term provided in this application applies and the definition of that term in the reference does not apply.

SUMMARY OF THE INVENTION

The present invention is directed to augmented reality systems, devices, and methods. In one aspect of the inventive subject matter, an augmented reality method is contemplated, the method comprising the steps of: activating a camera on an AR device; showing a stream of at least a portion of the camera's field of view on a display screen on the AR device; sending an image taken from the stream to a platform server, the image comprising a pin badge having a corresponding pin badge ID and augmented reality imagery stored in a database in the platform server, where the pin badge comprises at least one visually identifiable feature; receiving, from the platform server, augmented reality imagery corresponding to the pin badge ID; and incorporating the augmented reality imagery into the stream, where the augmented reality imagery is superimposed over the pin badge.

In some embodiments, the image (or, e.g., series of images or video) sent to the platform server includes at least one of a still image and a video clip. It is contemplated that the pin badge is wearable, and the augmented reality imagery can include one or a combination of a still image and an animation. In some embodiments, the augmented reality imagery includes at least one portion that is not superimposed over the pin badge in the stream. The augmented reality imagery can be confined to the area of the pin badge as shown in the stream, while in other embodiments aspects of the augmented reality imagery can extend beyond the edges of the pin badge.

In another aspect of the inventive subject matter, an augmented reality system is contemplated, the system comprising: an AR device comprising a camera, the AR device having an app installed thereon, where, upon execution, the app configures the AR device to activate a camera; show a stream of at least a portion of the camera's field of view on a display screen on the AR device; send an image taken from the stream to a platform server, the image comprising a pin badge having a corresponding pin badge ID and augmented reality imagery stored in a database in the platform server, where the pin badge comprises at least one visually identifiable feature; receive, from the platform server, the augmented reality imagery corresponding to the pin badge ID; and incorporate the augmented reality imagery into the stream, where the augmented reality imagery is superimposed over the pin badge.

In some embodiments, the image (or, e.g., series of images or video) sent to the platform server includes at least one of a still image and a video clip. It is contemplated that the pin badge is wearable, and the augmented reality imagery can include one or a combination of a still image and an animation. In some embodiments, the augmented reality imagery includes at least one portion that is not superimposed over the pin badge in the stream. The augmented reality imagery can be confined to the area of the pin badge as shown in the stream, while in other embodiments aspects of the augmented reality imagery can extend beyond the edges of the pin badge.

In another aspect of the inventive subject matter, an augmented reality system is contemplated, the system comprising: an AR device comprising a camera, the AR device having an app installed thereon, where, upon execution, the app configures the AR device to activate a camera; show a stream of at least a portion of the camera's field of view on a display screen on the AR device; send an image taken from the stream to a platform server, the image comprising a first pin badge having a first corresponding pin badge ID and a first augmented reality imagery stored in a database on the platform server and a second pin badge having a second corresponding pin badge ID and second augmented reality imagery stored in the database in the platform server, where the first pin badge comprises at least a first visually identifiable feature and where the second pin badge comprises at least a second visually identifiable feature; receive, from the platform server, the first augmented reality imagery corresponding to the first pin badge and the second augmented reality imagery corresponding to the second pin badge; and incorporate the augmented reality imagery into the stream, where the augmented reality imagery is superimposed over the pin badge.

As with other aspects described above, in some embodiments, the image (or, e.g., series of images or video) sent to the platform server includes at least one of a still image and a video clip. It is contemplated that the pin badge is wearable, and the augmented reality imagery can include one or a combination of a still image and an animation. In some embodiments, the augmented reality imagery includes at least one portion that is not superimposed over the pin badge in the stream. The augmented reality imagery can be confined to the area of the pin badge as shown in the stream, while in other embodiments aspects of the augmented reality imagery can extend beyond the edges of the pin badge.

Various objects, features, aspects, and advantages of the inventive subject matter will become more apparent from the following detailed description of preferred embodiments, along with the accompanying drawing figures in which like numerals represent like components.

BRIEF DESCRIPTION OF THE DRAWING

FIG. 7A shows an AR device with its camera pointed at a pin badge and its display screen showing the pin badge.

FIG. 7B shows augmented reality imagery introduced onto the display screen of the AR device where the augmented reality imagery extends beyond the pin badge shown on the display.

FIG. 8A shows an AR device with its camera pointed at a pin badge and its display screen showing the pin badge.

FIG. 8B shows augmented reality imagery introduced onto the display screen of the AR device where the augmented reality imagery is restricted by the outer edges of the pin badge as shown on the display.

DETAILED DESCRIPTION

Figure 1A:
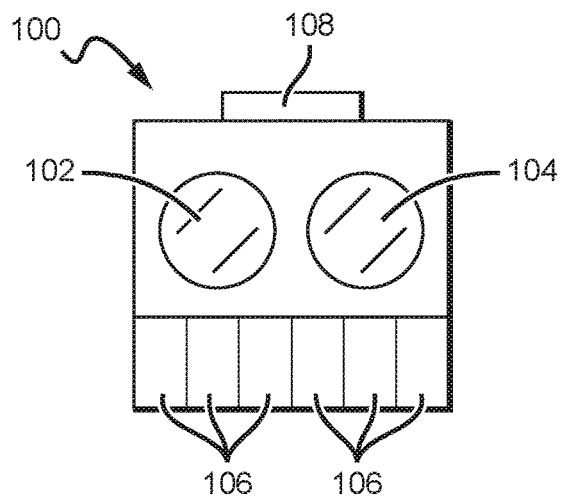
FIG. 1A is a front view of a pin badge showing its identifying features.
Figure 1B:
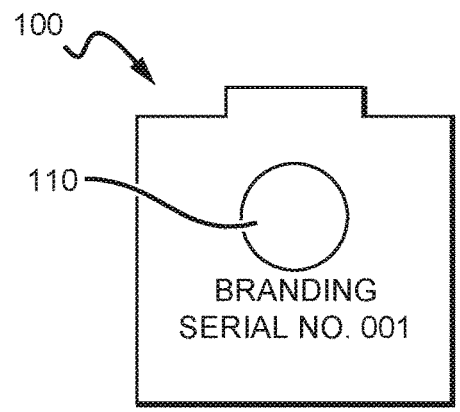
FIG. 1B is a rear view of the pin badge from FIG. 1A.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

It should be noted that any language directed to a computer should be read to include any suitable combination of computing devices, including servers, interfaces, systems, databases, agents, peers, Engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided in this application is prior art or relevant to the presently claimed invention, or that any publication specifically or implicitly referenced is prior art.

This application is directed augmented reality systems and methods that bring wearable pin badges to life. The inventive subject matter involves capturing video, identifying a wearable pin badge in that video, and then adding content based on that pin badge. A variety of different embodiments are described in detail below. Thus, embodiments of the inventive subject matter incorporate pin badges and at least one AR device (e.g., a computing device having a display and a camera, a computing device having a display with a camera coupled thereto, augmented reality glasses, etc.). In some embodiments, a server or set of servers (e.g., cloud servers) are implemented to remotely store information or to conduct remote processes.

FIGS. 1A-3B show front views of example embodiments of pin badges of the inventive subject matter. Each pin badge can take on a different shape and have different surface features, all of which can facilitate how easily an AR device can recognize each pin badge. For example, FIG. 1A shows the front of pin badge 100 incorporates mostly right angles and includes identifying surface features 102, 104, and 106. As pin badge 100 is designed to resemble a robot, features 102 and 104 are large relative to the overall size of the pin badge and meant to be a robot's eyes, while features 106 are intended to appear as the robot's teeth. Pin badge 100 also includes a top portion 108 that sticks out from the rest of the pin badge. These features, in association with the overall shape of the pin badge as well as, in some embodiments, surface colors, can make it easier for an AR device to recognize pin badge 100. FIG. 1B shows a rear view of pin badge 100. The back side of pin badge 100 includes a coupling mechanism 110 and can additionally include identifiers such as a serial number and branding.

Figure 2A:
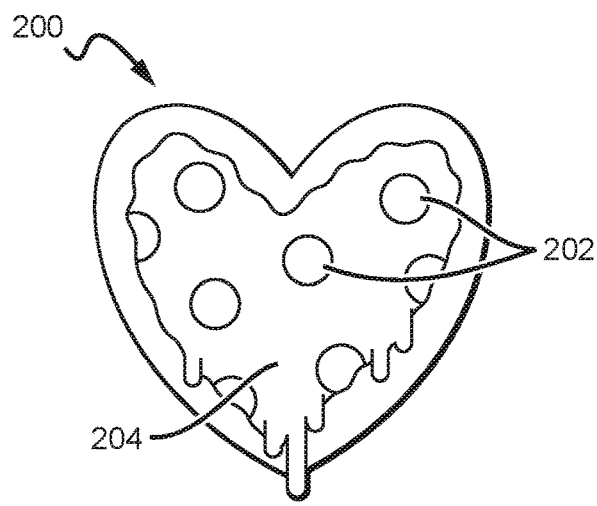
FIG. 2A is a front view of another pin badge showing its identifying features.
Figure 2B:
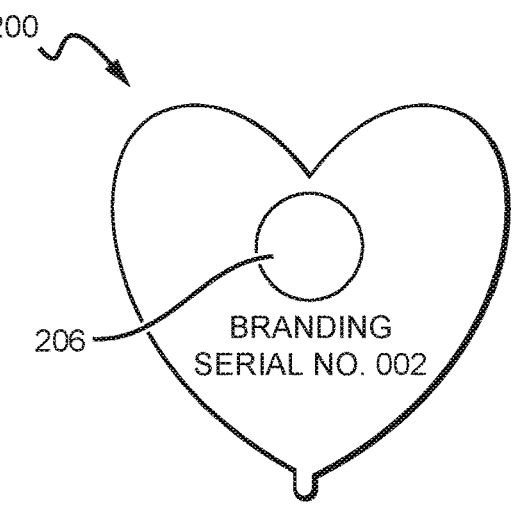
FIG. 2B is a rear view of the pin badge from FIG. 2A.

FIG. 2A shows another pin badge 200 having a different overall shape (e.g., a heart) along with dots 202 and a melting interior heart 204. This embodiment demonstrates several other identifiers that an AR device can use to recognize a specific pin badge. For example, in some embodiments, the AR device might look for a quantity of circles 202. As with pin badge 100, the overall shape of pin badge 200 (e.g., a heart shaped outline) can also make it easier for the AR device to identify pin badge 200. Pin badge 200 also features a heart having a melting appearance (e.g., the pin badge in its entirety is intended to look like a pizza with the cheese melting downward), and that melting heart on depicted on the pin badge can also be used by an AR device to facilitate identification of pin badge 200. FIG. 2B shows a rear view of pin badge 200. The back side of pin badge 200 includes a coupling mechanism 206 and can additionally include identifiers such as a serial number and branding. In the example shown in FIG. 2A, where the heart is configured as a heart-shaped pizza, an AR device can differentiate between different heart-shaped pizza pin badges by, e.g., looking for different internal identifiers such as pepperonis (as shown in FIG. 2A) or other toppings such as pineapple pieces despite both pin badges having otherwise identical forms. Although each element of a pin badge can facilitate identification, systems of the inventive subject matter are contemplated as being able to distinguish between pin badges based on one or more identifying features instead of requiring all identifying features be present and visible to recognize a pin badge (e.g., surface decorations, lines, and colors).

The back sides of each pin badge shown above in FIGS. 1B, 2B, and 3B can alternatively or additionally feature a SKU (e.g., in place of the words BRANDING SERIAL NO 00X). In some embodiments, this SKU is a unique identifier that can be used to identify a pin badge within a software application running on an AR device. A SKU can be used, e.g., with push notifications that appear within an app. For example, if a pizza pin badge (e.g., the pin badge shown in FIGS. 2A and 2B) is scanned, PFPIZZA01 can be written on the back. Then, an application running on the AR device would associate that pin badge's design with PFPIZZA01. If an animation or interaction is updated for that pin badge, it would be possible to use a push notification tool to target users who have scanned PFPIZZA01 to let them know there is new content.

Figure 3A:
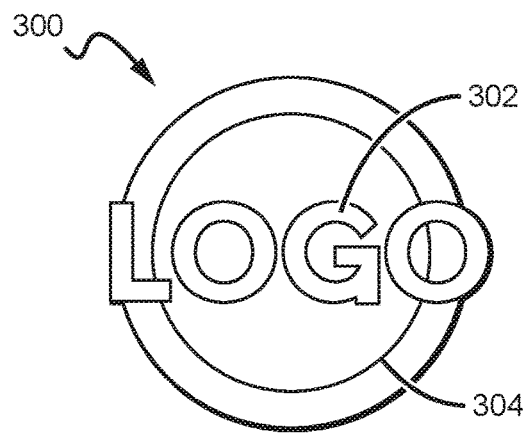
FIG. 3A is a front view of another pin badge showing its identifying features.
Figure 3B:
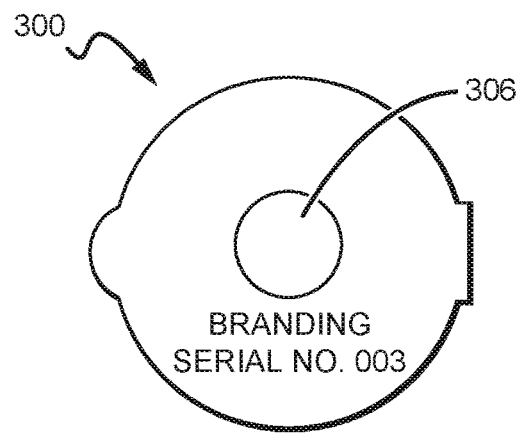
FIG. 3B is a rear view of the pin badge from FIG. 3A.

FIG. 3A shows another pin badge 300 featuring a placeholder image on its surface that is representative of a brand's logo. Thus, in place of the word "LOGO" shown in FIG. 3A, any logo can be shown and pin badge 300 can accordingly be added to a database of pin badges that an AR device can recognize. In addition to whatever brand logo replaces the word LOGO as shown in the Figure, an AR device can also use both the overall shape of pin badge 300 as well as inner circle 304 to help recognize the pin badge. It is contemplated that whatever logo replaces the word LOGO can be contained completely within the outer edges of the otherwise circular pin badge, or, in some embodiments, the logo can extend beyond the otherwise circular shape of pin badge 300. FIG. 3B shows a rear view of pin badge 300. The back side of pin badge 300 includes a coupling mechanism 306 and can additionally include identifiers such as a serial number and branding.

Figure 6:
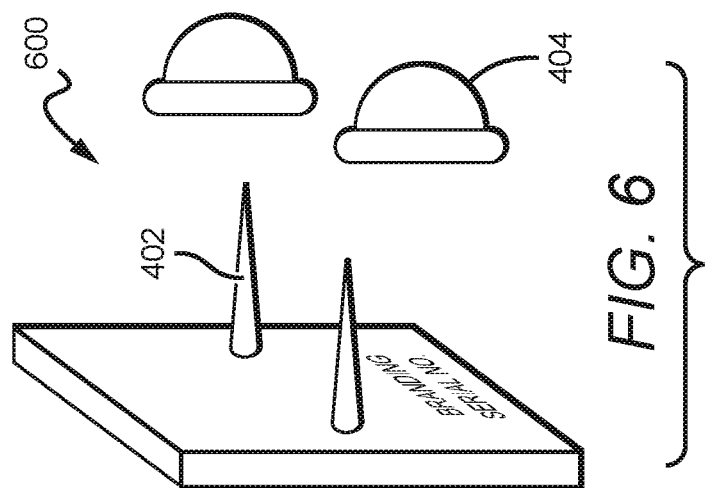
FIG. 6 shows another pin badge coupling mechanism.
Figure 5:
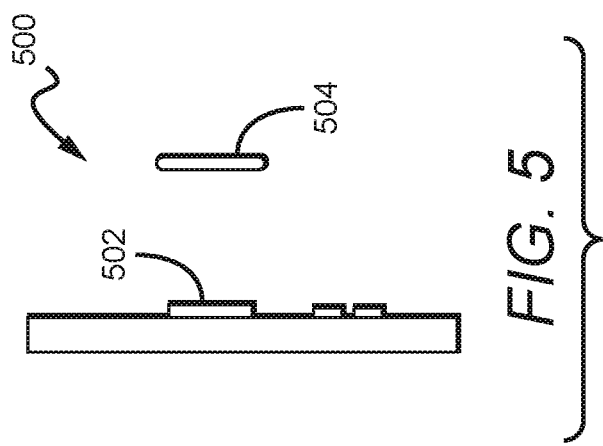
FIG. 5 shows another pin badge coupling mechanism.
Figure 4:
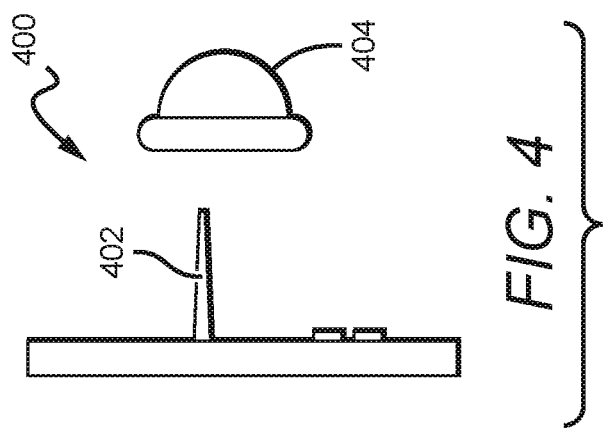
FIG. 4 shows a pin badge coupling mechanism.

FIGS. 4-6 show side views of pin badges having different coupling mechanisms, where the coupling mechanisms are intended to allow a person to wear a pin badge on, e.g., their clothing. FIG. 4 shows a pin badge 400 having a coupling mechanism comprising a pointed protrusion 402 that can be pressed through a piece of fabric to couple with a holding piece 404, where holding piece 404 receives pointed protrusion 402 such that the pointed end cannot poke into a wearer's skin. FIG. 5 shows a pin badge 500 having a magnetized coupling mechanism. In some embodiments one of 502 and 504 is at least partially magnetized, while the opposite part is made from a material that can be subjected to induced magnetization. In some embodiments both 502 and 504 are made at least in part from a magnet. FIG. 6 demonstrates that the coupling mechanism of FIG. 4 can be duplicated on the back of some pin badges of the inventive subject matter. The same can be true of the coupling mechanism shown in FIG. 5.

Each of FIGS. 1A-3B an AR device can be configured to recognize pin badge 100 based on all or any subset of identifiable aspects of pin badge 100. Each of features 102, 104, 108 and 108 can contribute to how easy it is for an AR device to recognize pin badge 100. For example, camera resolution can vary, and pin badges can be differing distances from a camera, both of which can contribute to how easily an AR device can recognize a pin badge. With a higher resolution camera, features can be identified from increasing distances and smaller features can also be recognized. In some embodiments, large, exaggerated features such as circles 102 and 104 can be more easily recognized by machine vision software than smaller features. The same is true of the overall shape of a pin badge, which can make pin badges easier to recognize.

FIGS. 7A-7B show how an AR device 700 used in association with pin badge 200 from FIG. 2A. AR device 700, which features a camera, is pointed at pin badge 200. To bring about an augmented reality effect, AR device 700 features software installed thereon that, upon execution, allows AR device 700 to display an augmented reality image on its display that coincides with the image of pin badge 200, as shown in FIG. 7B. It is contemplated that the AR device's screen in FIG. 7A shows a live video stream of all or at least a portion of the camera's field of view (e.g., similar to opening a camera app on a phone where a preview is shown on the phone's display). It is contemplated that every embodiment described in this application incorporates such a live video stream and that augmented reality imagery is added to that live video stream. Augmented reality imagery can be, e.g., a still image, a set of still images, a video, a set of videos, a dynamically rendered visual, a pre-rendered visual, an advertisement, an interactive overlay (e.g., virtual buttons or advertisements that can be pressed by AR device users), or any other visual that can be incorporated by augmented reality systems.

Thus, FIG. 7B shows AR device 700 with an augmented reality image shown on its display, where the augmented reality image is based on recognition of pin badge 200. In this case, AR device 700 shows both pin badge 200 as well as additional hearts around pin badge 200 and a message, "YOU HAVE A PIZZA MY." In some embodiments, AR device 700 can leave an image of pin badge 200 unaltered on its display while adding other imagery around the image of pin badge 200, while in other embodiments, for example, a new image based on pin badge 200 can be superposed over the AR device display's presentation of pin badge 200. In still further embodiments, augmented reality imagery can be superimposed over a portion of pin badge 200. FIG. 7B shows an example where additional imagery (e.g., animations, static images, etc.) are added based on the pin badge in the AR device's live video stream with minimal superposing or superimposing over the image of pin badge 200.

FIG. 8A shows an example where AR device 800 is pointed at pin badge 802, and an image of pin badge 802 is then shown on the screen. Next, as shown in FIG. 8B, AR device 800 superimposes an animation 804 over the face of pin badge 802 on its display. It is contemplated that all or substantially all of pin badge 802 can be covered by animation 804 without any of animation 804 extending beyond the edges of the pin badge 802.

Figure 9A:
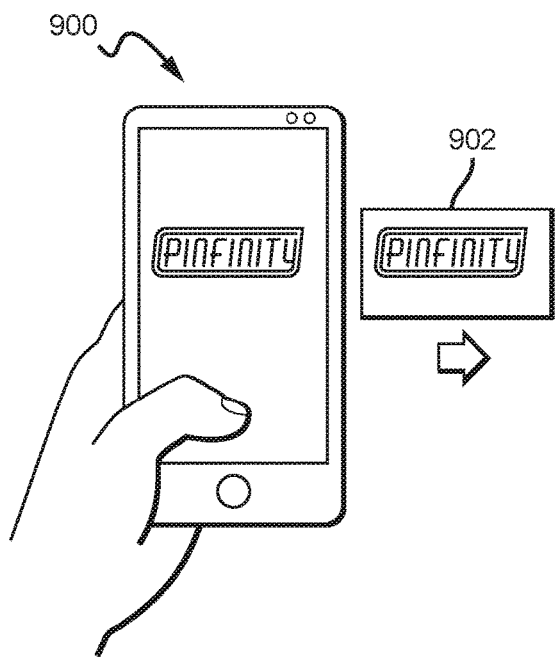
FIG. 9A shows an AR device with its camera pointed at a pin badge and its display screen showing the pin badge.
Figure 9B:
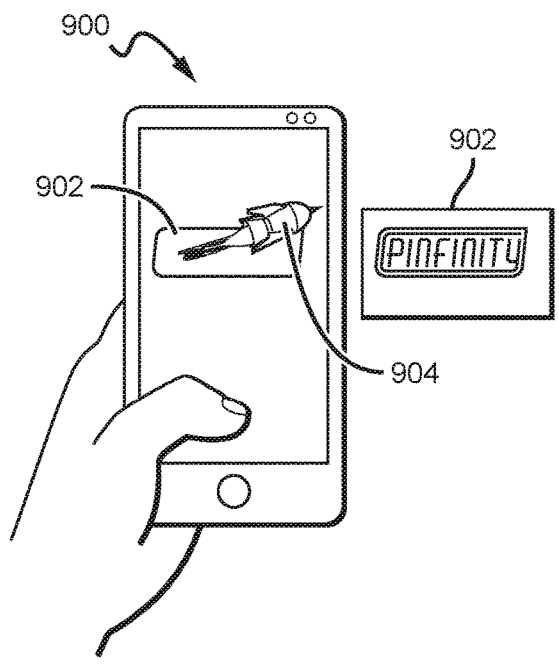
FIG. 9B shows augmented reality imagery introduced onto the display screen of the AR device where the augmented reality imagery is partially confined by the pin badge as shown on the display with additional imagery that animates away from the pin badge.

FIGS. 9A and 9B show an embodiment where augmented reality imagery is shown on an AR device 900 display, where the augmented reality imagery is based on the shape of pin badge 902 and where the augmented reality imagery also includes a portion that animates away from the pin badge as it appears on the AR device's display (e.g., a portion that is unconfined by the image of pin badge 902 as it appears on the AR device's display). FIG. 9A shows AR device 900 pointed at pin badge 902, with pin badge 902 appearing on its display. Once the AR device 900 recognizes pin badge 902, it then adds augmented reality features to its display based on pin badge 902. In this instance, because pin badge 900 features a brand name on an elongated plate, the AR device blacks out the wording of the brand over all (or, in some embodiments at least a portion) of pin badge 902 and adds an animated spaceship 904 on the AR device's display, where the animated spaceship 904 is depicted as leaving the confines of pin badge 902. This animation can be configured to loop or, in some embodiments, to play once. Thus, the AR device 900 adds an animation to the AR device's live video stream that is largely superposed over pin badge 902, with an additional aspect (e.g., spaceship 904) that is added such that it appears to come off pin badge 902.

Figure 10A:
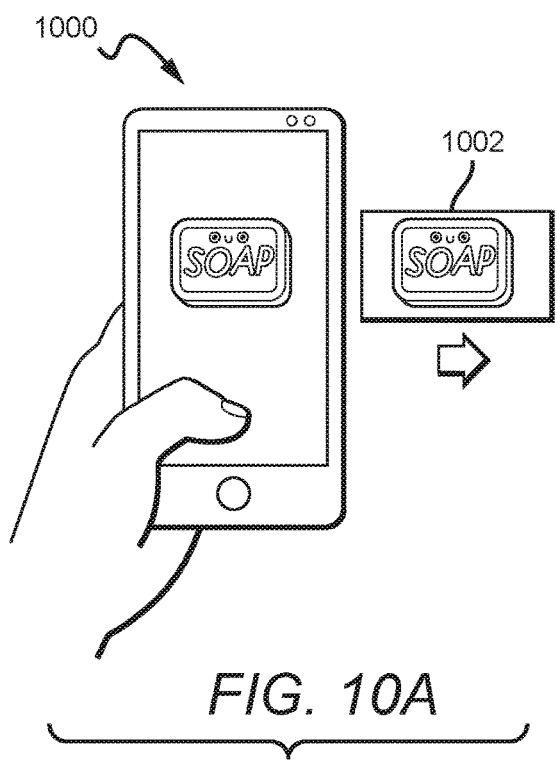
FIG. 10A shows an AR device with its camera pointed at a pin badge and its display screen showing the pin badge.
Figure 10B:
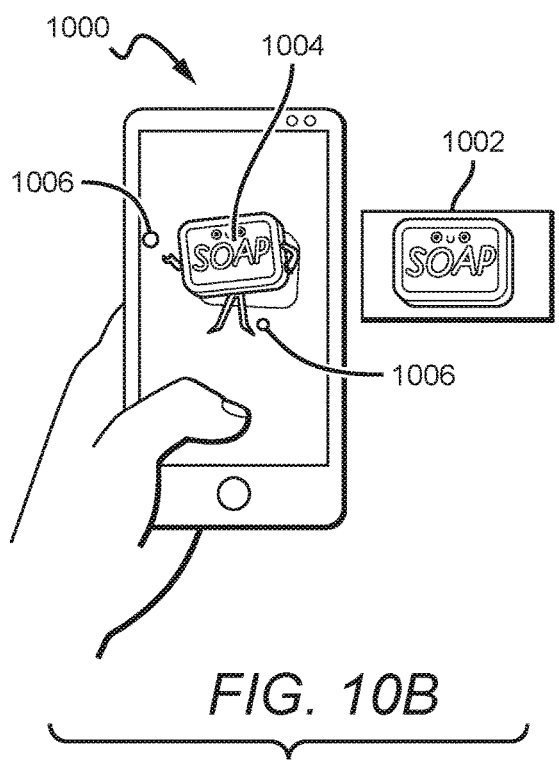
FIG. 10B shows augmented reality imagery introduced onto the display screen of the AR device where the augmented reality imagery is an animation based on the pin badge.

FIGS. 10A and 10B show an embodiment where augmented reality imagery 1004 is shown on an AR device 1000 display, where the augmented reality imagery 1004 is based on the shape of pin badge 1002 and where the augmented reality imagery 1002 is not confined to the portion of the display that the pin badge 1002 appears on. Pin badge 1002, as shown in both figures, is shaped as a cartoony bar of soap. When a camera on AR device 1000 is pointed at pin badge 1002, AR device adds augmented reality imagery 1004, which is based on pin badge 1002. As shown in FIG. 10B, augmented reality imagery 1004 features what is essentially the imagery on the face of pin badge 1002 where the augmented reality imagery is animated to dance. Small bubbles 1006 are also added to the scene. Thus, the AR device 1000 adds an animation that is largely animated in the same location on the screen as pin badge 902 to its live video stream, with additional aspects (e.g., bubbles 1006) that are added in areas surrounding the animation (augmented reality imagery 1004).

Although FIGS. 7A-10B show how systems and methods of the inventive subject matter can introduce augmented reality imagery into imagery captured by an AR device's camera, each of those examples show how that augmented reality imagery behaves while the pin badge is still within AR device's camera's field of view. FIGS. 11A-11D show how systems and methods of the inventive subject matter can react when a pin badge is removed from a camera's field of view. Each of FIGS. 11A-11D show a portion of an AR device's display screen showing a live video stream from its camera when a pin badge is initially in the camera's field of view and then when the pin is removed from the camera's field of view.

Figure 11A:
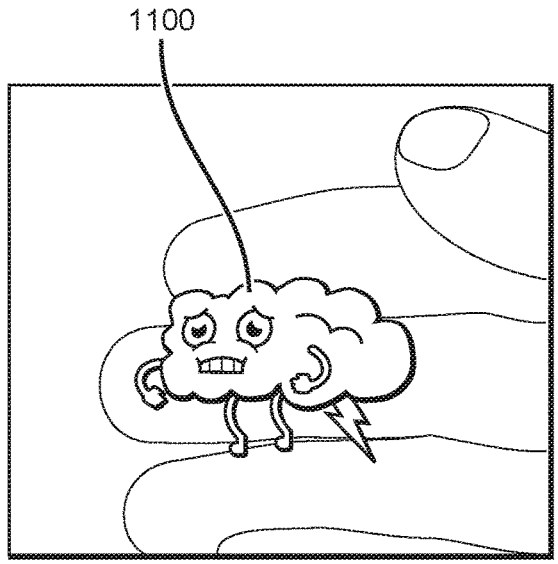
FIGS. 11A-11D show how systems and methods of the inventive subject matter react to removal of a pin badge from an AR device's camera's field of view.
Figure 11B:
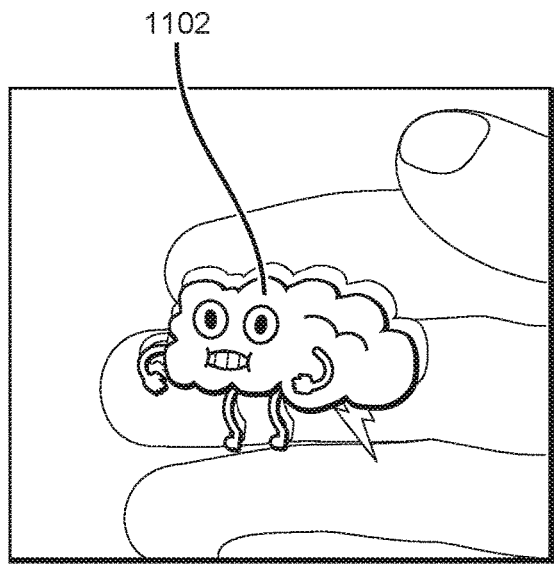
Figure 11C:
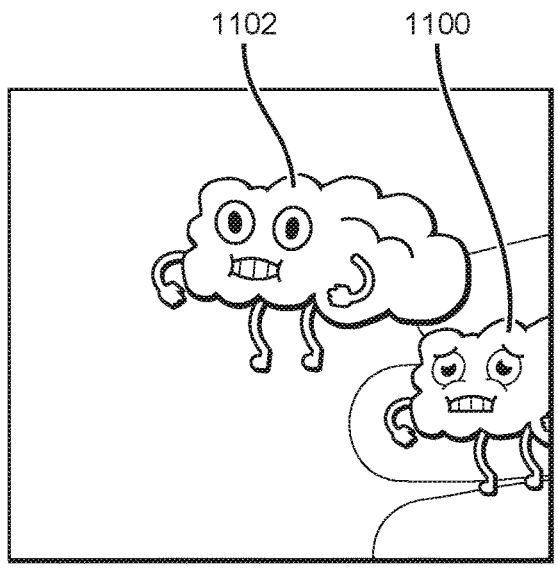
Figure 11D:
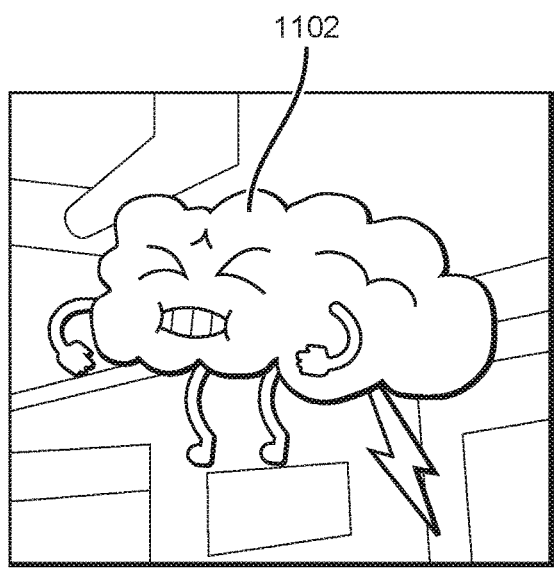

FIG. 11A shows a pin badge 1100 as it appears on an AR device's display screen when the AR device is undertaking steps, described below, to identify the pin badge and to introduce augmented reality imagery and to have that augmented reality imagery persist even when the pin badge is removed from the AR device's field of view. In FIG. 11B, augmented reality imagery 1102 is introduced over pin badge 1100. Then, as shown in FIG. 11C, as pin badge 1100 is removed from the AR device's camera's field of view, augmented reality imagery 1102 becomes separated from pin badge 1100 as it moves off screen. Finally, FIG. 11D shows augmented reality imagery 1102 on the AR device's display despite pin badge 1100 being completely removed from the AR device's camera's field of view. Though augmented reality imagery 1102 is depicted as an animation, any other type of augmented reality imagery discussed in this application can be handled in the same way when its associated pin badge is removed from an AR device's camera's field of view.

To make the features describe above possible, several different systems and methods are contemplated. In some embodiments, hardware to bring such a system to life includes an AR device having executable software code stored thereon. Upon running that software, the AR device is configured to carry out a variety of different functions to create the augmented reality imagery contemplated in this application. In some embodiments, systems and methods of the inventive subject matter use at least one AR device as well as a platform server (e.g., a server, a set of servers, cloud servers, etc.), where the AR device communicates with the platform server.

Figure 12A:
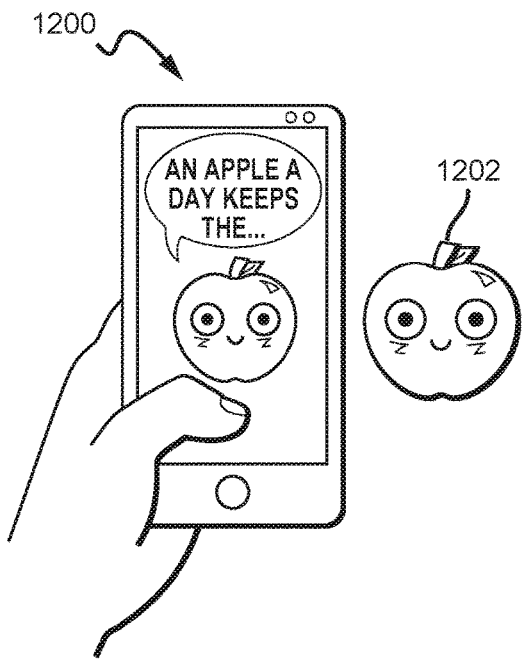
FIGS. 12A-12D show how a system of the inventive subject matter reacts to the presence of multiple pin badges.
Figure 12B:
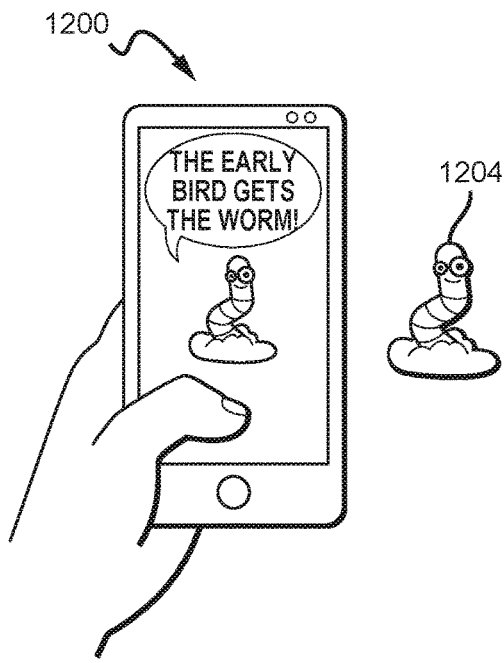

In some embodiments, when, for example, multiple pin badges are placed in an AR device's field of view, new augmented reality imagery can be displayed that is different from augmented reality imagery specific to each pin badge individually. FIGS. 12A-12D show such an embodiment. FIG. 12A shows an AR device 1200 pointed at an apple pin badge 1202, while FIG. 12B shows the AR device 1200 pointed at a worm pin badge 1204. In FIG. 12A, AR device 1200 shows augmented reality imagery based on pin badge 1202, and in FIG. 12B, AR device 1200 shows augmented reality imagery based on pin badge 1204.

Figure 12C:
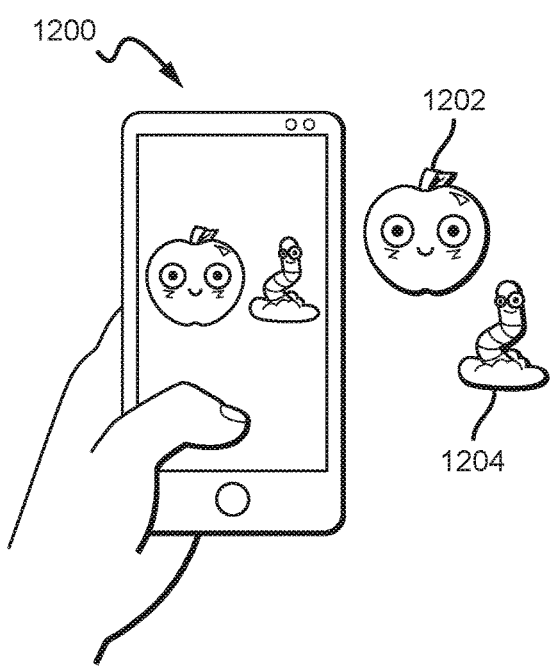

FIG. 12C shows AR device 1200 pointed at both pin badges 1202 and 1204. Its display shows both pin badges side by side before augmented reality imagery is introduced. During this phase, software on the AR device can perform steps described below for retrieving additional information and augmented reality imagery related to pin badges 1202 and 1204. In this instance, though, because both pin badges 1202 and 1204 are visible simultaneously, augmented reality imagery that is unique based on the combination of visible pin badges is retrieved instead of retrieving augmented reality imagery specific to each pin badge individually as shown in FIGS. 12A and 12B.

Figure 12D:
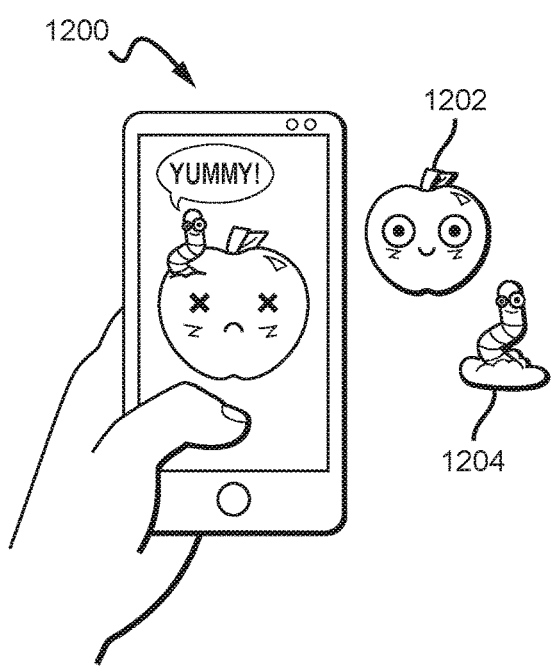

FIG. 12D thus shows AR device 1200 displaying augmented reality imagery that is only retrieved when the combination of pin badges 1202 and 1204 are in its field of view. In this case, the apple pin badge 1202 and the worm pin badge 1204 result in augmented reality imagery showing a worm coming out of an apple as shown in FIG. 12D.

Figure 13:
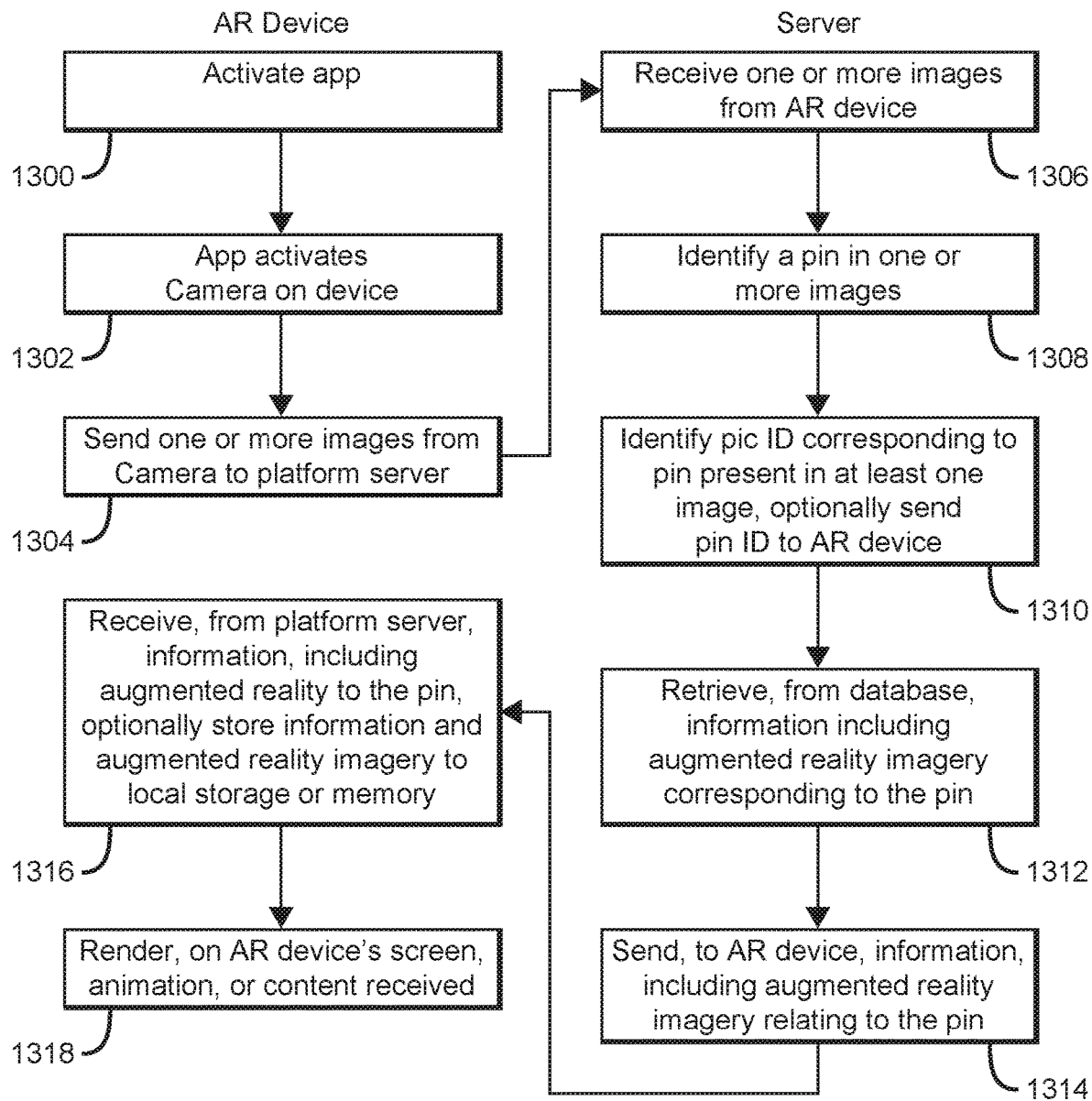
FIG. 13 is a flow chart showing some steps involved in implementing methods of the inventive subject matter.

FIG. 13 is a flow chart showing how an AR device can communicate with a server according to the inventive subject matter. The left column shows AR device actions while the right column shows server actions. In step 1300, a user activates a software application on the AR device. The software can be, e.g., a standalone app, or, in some embodiments, it can be incorporated into existing software on a smartphone (e.g., a modification to a camera app). Once open, the app activates the AR device's camera, per step 1302, and a live feed of imagery captured by the camera is shown on a display on the AR device.

According to step 1304, images from the AR device's camera are sent to a platform server. While the AR device's camera is activated (e.g., while running software associated with systems and methods of the inventive subject matter), if a user points the AR device at a pin badge of the inventive subject matter (e.g., as shown in FIGS. 7A, 8A, 9A, 10A, 12A, 12B, and 12C), images including that pin badge will be transmitted set to the platform server. In some embodiments, the AR device can stream uncompressed and unaltered video from its camera to the platform server. It is also contemplated that the AR device can send still images taken from video captured by the AR device. This can be accomplished at some sampling rate to, e.g., reduce bandwidth usage. In some embodiments, images from the AR device can be transmitted to the platform server at, e.g., 0.5-5 images per second, 5-10 images per second, 10-20 images per second, 20-60 images per second, 60-120 images per second, 120-240 images per second, and so on.

In some embodiments, the number of images sent per second can be modified depending on phases of pin badge recognition. For example, while an AR device is active and capturing video, it can send images to the platform server at a first sampling rate (e.g., any of the rates described above). Once the platform server detects that a pin badge exists in the image, it can request that the AR device then be sent to the platform server at a second sampling rate (e.g., at a rate higher than the first sampling rate) to facilitate identification of the pin badge by the platform server. It is contemplated that images or video sent to the platform server by the AR device can be altered to facilitate pin badge identification (e.g., color inversion, color manipulation, etc.).

Thus, in step 1306, the platform server receives images from the AR device and in step 1308 the platform server identifies the pin badge. In some embodiments, the platform server identifies multiple pin badges, as contemplated above regarding FIGS. 12C and 12D. Once the platform server determines that a pin badge exists in an image from an AR device, it analyzes one or more of the images from the AR device to identify a pin badge ID associated with the pin badge present in those images according to step 1310. In some embodiments, these steps are undertaken in overlapping manner, e.g., when the platform server identifies that a pin badge exists in an image from an AR device, that same image is then analyzed to identify—or to begin identifying—a pin badge ID associated with that pin badge. The process of identifying a pin badge ID associated with the pin badge involves examining the image for identifying features that pin badges can include (described above regarding FIGS. 1A, 2A, and 3A). The platform server analyzing one or more images from the AR device to identify a pin badge ID associated with the pin badge can, e.g., account for situations where the pin badge is not perfectly facing the AR device's camera and nevertheless accurately identify the pin badge.

Next, according to step 1312, the platform server retrieves additional information including augmented reality imagery corresponding to the pin badge using at least the pin badge ID. In embodiments where multiple pin badges exist in the analyzed images, the platform server retrieves additional information including augmented reality imagery corresponding to multiple pin badges using pin badge IDs. This can be accomplished by using the pin badge ID to search for information stored in a database. When multiple pin badges are visible, the platform server can search for database entries using both pin badges, and, if a database entry exists that is specific to a search based on multiple pin badge IDs, it can retrieve information including augmented reality imagery that is specific to that combination of pin badge IDs. FIG. 13 should be understood as describing embodiments where multiple pin badges are visible to an AR device.

Additional information corresponding to a pin badge ID can include additional augmented reality imagery. Augmented reality imagery can include static imagery, an animation, or a combination thereof. Other information can be retrieved in step 1312, such as the pin badge ID, a price to buy the pin badge, a link to purchase the pin badge, etc. In some embodiments, the additional information can include video, animation, music, sound, social media selfie frames, streaming video, call-to-action buttons allow users to access external content on the web or another app, 360-degree immersive photo and video, a mini-game, and randomized codes that can be input into a third-party application to access downloadable content.

In step 1314, the platform server sends information including augmented reality imagery corresponding to the pin badge back to the AR device. The AR device receives information including the augmented reality imagery from the platform server in step 1316. Once the AR device has received the augmented reality imagery from the platform server, it can then introduce the augmented reality imagery to the content shown on its display as discussed above with respect to FIG. 7A-10B and according to step 1318.

In some embodiments, the software on the AR device is configured to perform steps otherwise undertaken by the platform server as described in FIG. 13, obviating any need for interaction with the platform server. In such embodiments, instead of sending an image of a pin badge to a platform server, the AR device running an app associated with systems and methods of the inventive subject matter is capable of taking all steps necessary to analyze one or more images to identify a pin badge, to identify a pin badge ID, to retrieve information from a database that is stored locally on the AR device.

In some embodiments, the AR device can save information and augmented reality imagery to local memory or storage (e.g., cache or other local memory), as described in step 1316. Thus, when a pin badge ID is identified by the platform server in step 1310, the server can send, e.g., the pin badge ID back to the AR device to allow the AR device to determine whether the relevant information and augmented reality imagery already exists locally on the AR device. If, for example, the AR device already has the augmented reality imagery associated with the pin badge ID stored to cache, then the platform server has no need to send that augmented reality imagery to the AR device, and the AR device can move on to step 1316, thereby saving bandwidth. It is contemplated that, although this application describes the AR device as storing augmented reality imagery and other information to cache or other local memory in step 1316, this can be accomplished at any time after the AR device has received augmented reality imagery and other information from the platform server. In embodiments where no platform server is required, all augmented reality imagery and other information associated with different pin badges is locally stored to begin with, making these steps unnecessary.

Thus, specific augmented reality systems and methods are disclosed in this application. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. An augmented reality method comprising the steps of:
   activating a camera on an AR device;
   showing a live stream of at least a portion of a field of view of the camera on a display screen on the AR device;
   sending, from the AR device, a series of still images taken by the camera at a predetermined sampling rate to a platform server, the series of still images comprising a pin badge having a corresponding pin badge ID and associated augmented reality imagery stored in a database in the platform server, wherein the series of still images comprises a pin badge having at least one visually identifiable feature and an overall pin badge shape;
   visually identifying, by the platform server, the pin badge in the series of still images based on the overall shape and the at least one visually identifiable feature of the pin badge;
   identifying in a database, by the platform server, the corresponding pin badge ID based on the identified pin badge and the associated augmented reality imagery based on the corresponding pin badge ID;
   transmitting, from the platform server to the AR device, the associated augmented reality imagery;
   receiving, by the AR device, the associated augmented reality imagery; and
   incorporating the augmented reality imagery into the live stream.

2. The method of claim 1, wherein the series of still images comprise a video.

3. The method of claim 1, wherein the live stream displays the augmented reality imagery as both superimposed over the pin badge and also displayed in areas around the pin badge.

4. The method of claim 1, wherein the live stream shows the augmented reality imagery superimposed over the pin badge such that the entire pin badge is covered by the augmented reality imagery.

5. The method of claim 1, wherein the live stream shows the augmented reality imagery such that the pin badge is entirely visible in the live stream.

6. The method of claim 1, wherein the augmented reality imagery is confined to the area of the pin badge as shown in the live stream.

7. An augmented reality system comprising:
   an AR device comprising a camera, the AR device having an app installed thereon, wherein, upon execution, the app configures the AR device to:
   activate a camera on the AR device;
   show a live stream of at least a portion of a field of view of the camera on a display screen on the AR device;
   send, to a platform server, a series of still images taken by the camera at a predetermined sampling rate to a platform server, the series of still images comprising a pin badge having a corresponding pin badge ID and associated augmented reality imagery stored in a database in the platform server, wherein the series of still images comprises the pin badge having at least one visually identifiable feature and an overall pin badge shape;
   receive, from the platform server, the associated augmented reality imagery that the platform server identified from the pin badge appearing in the series of still images based on the visually indentifiable feature and based on the overall pin badge shape, wherein the augmented reality imagery corresponds to the coreesponding pin badge ID; and incorporate the augmented reality imagery into the live stream.

8. The system of claim 7, wherein the series of still images comprise a video.

9. The system of claim 7, wherein the live stream displays the augmented reality imagery as both superimposed over the pin badge and also displayed in areas around the pin badge.

10. The system of claim 7, wherein the live stream shows the augmented reality imagery superimposed over the pin badge such that the entire pin badge is covered by the augmented reality imagery.

11. The system of claim 7, wherein the live stream shows the augmented reality imagery includes at least one portion that is not superimposed over the pin badge in the stream.

12. The system of claim 7, wherein the augmented reality imagery is confined to the area of the pin badge as shown in the live stream.

13. An augmented reality system comprising:
an AR device comprising a camera, the AR device having an app installed thereon, wherein, upon execution, the app configures the AR device to:
activate a camera on the AR device;
show a live stream of at least a portion of a field of view of the camera a display screen on the AR device;
send, to a platform server, a series of still images taken by the camera at a predetermined sampling rate to a platform server, the series of still images comprising:
a first pin badge having a first corresponding pin badge ID and a first associated augmented reality imagery stored in a database on the platform server; and
a second pin badge having a second corresponding pin badge ID and second associated augmented reality imagery stored in the database in the platform server;

wherein the first pin badge comprises at least a first visually identifiable feature and a first overall pin badge shaper, and wherein the second pin badge comprises at least a second visually identifiable feature and a second overall pin badge shape;

receive, from the platform server, a third augmented reality imagery corresponding to a combined presence of both the first pin badge and the second pin badge, wherein the combined presence is determined based on detecting the first visually identifiable feature and the first overall pin badge shape and based on simultaneously detecting the second visually identifiable feature and the second overall pin badge shape; and incorporate the third augmented reality imagery into the stream.

14. The system of claim 13, wherein the series of still images comprise a video.

15. The system of claim 13, wherein the live stream displays the third augmented reality imagery as both superimposed over the pin badge and also displayed in the areas around the pin badge.

16. The system of claim 13, wherein the live stream shows the third augmented reality imagery superimposed over the first pin badge and the second pin badge such that both the first pin badge and the second pin badge are entirely covered by the third augmented reality imagery.

17. The system of claim 13, wherein the live stream shows the third augmented reality imagery such that the first pin badge and the second pin badge are both entirely visible in the live stream.

18. The system of claim 1, wherein the augmented reality imagery persists in the livestream after removing the pin badge from the field of view of the camera.

19. The system of claim 7, wherein the augmented reality imagery persists in the livestream after removing the pin badge from the field of view of the camera.

20. The system of claim 13, wherein the third augmented reality imagery persists in the livestream after removing at least one of the first pin badge and the second pin badge from the field of view of the camera.

* * * * *